(12) United States Patent
Thrimawithana et al.

(10) Patent No.: US 11,043,846 B2
(45) Date of Patent: Jun. 22, 2021

(54) HYBRID INDUCTIVE POWER TRANSFER SYSTEM

(71) Applicant: Auckland UniServices Limited, Auckland (NZ)

(72) Inventors: Duleepa Jayanath Thrimawithana, Mt Wellington (NZ); Udaya Kumara Madawala, Stonefields (NZ); Grant Anthony Covic, Mount Albert (NZ); Lei Zhao, Parnell (NZ)

(73) Assignee: Auckland UniServices Limited, Auckland (NZ)

( * ) Notice: Subject to any disclaimer, the term of this patent is extended or adjusted under 35 U.S.C. 154(b) by 187 days.

(21) Appl. No.: 15/750,451

(22) PCT Filed: Aug. 5, 2016

(86) PCT No.: PCT/NZ2016/050125
§ 371 (c)(1),
(2) Date: Feb. 5, 2018

(87) PCT Pub. No.: WO2017/023180
PCT Pub. Date: Feb. 9, 2017

(65) Prior Publication Data
US 2018/0233953 A1   Aug. 16, 2018

(30) Foreign Application Priority Data
Aug. 6, 2015 (NZ) .......................... 710795

(51) Int. Cl.
| H02J 50/12 | (2016.01) |
| H02J 50/40 | (2016.01) |
| H02M 3/337 | (2006.01) |

(52) U.S. Cl.
CPC .............. *H02J 50/12* (2016.02); *H02J 50/40* (2016.02); *H02M 3/3376* (2013.01)

(58) Field of Classification Search
CPC .. H02J 50/00; H02J 50/12; H02J 50/40; H02J 50/90
(Continued)

(56) References Cited

U.S. PATENT DOCUMENTS 9,859,707 B2 * 1/2018 Corum ..................... H04B 3/52
2010/0259217 A1 * 10/2010 Baarman ............... H02J 7/0013
320/108

(Continued)

FOREIGN PATENT DOCUMENTS

| WO | WO-2010090539 A1 | 8/2010 |
| WO | WO-2011016737 A1 | 2/2011 |

(Continued)

OTHER PUBLICATIONS

"International Application No. PCT/NZ2016/050125, International Search Report and Written Opinion dated Nov. 11, 2016", (Nov. 11, 2016), 15 pgs.

(Continued)

*Primary Examiner* — Rexford N Barnie
*Assistant Examiner* — Joseph N Inge
(74) *Attorney, Agent, or Firm* — Schwegman Lundberg & Woessner. P.A.

(57) ABSTRACT

An inductive power transfer system primary or secondary circuit has a first compensation network and second compensation network. The compensation networks each have a different power transfer characteristic with respect to relative movement of the primary or secondary magnetic flux coupling structures. The power transfer characteristics are such that one compensates for the other to allow a smooth or constant overall power transfer is despite the relative movement.

18 Claims, 7 Drawing Sheets

(58) Field of Classification Search
USPC .......................................................... 307/104
See application file for complete search history.

(56) References Cited

U.S. PATENT DOCUMENTS

| | | | | |
|---|---|---|---|---|
| 2011/0304216 A1* | 12/2011 | Baarman | ................. | H02J 5/005 |
| | | | | 307/104 |
| 2012/0313444 A1* | 12/2012 | Boys | ...................... | H02J 50/12 |
| | | | | 307/104 |
| 2015/0015197 A1* | 1/2015 | Mi | ........................ | B60L 53/122 |
| | | | | 320/108 |
| 2015/0061403 A1* | 3/2015 | Jeong | ........................ | H02J 7/02 |
| | | | | 307/104 |

FOREIGN PATENT DOCUMENTS

| | | | | |
|---|---|---|---|---|
| WO | WO-2011145953 | | 11/2011 | |
| WO | WO-2011145953 A1 * | 11/2011 | ............. | H01F 38/14 |
| WO | WO-2012018269 | | 2/2012 | |
| WO | WO-2014035260 | | 3/2014 | |
| WO | WO-2014035260 A1 * | 3/2014 | ............. | H02J 50/40 |
| WO | WO-2017023180 | | 2/2017 | |

OTHER PUBLICATIONS

"International Application No. PCT/NZ2016/050125, International Preliminary Report on Patentability dated Feb. 6, 2018", (Feb. 6, 2018), 9 pgs.

* cited by examiner

HYBRID INDUCTIVE POWER TRANSFER SYSTEM

PRIORITY CLAIM TO RELATED APPLICATIONS

This application is a U.S. national stage application filed under 35 U.S.C. § 371 from International Application Serial No. PCT/NZ2016/050125, which was filed 5 Aug. 2016, and published as WO2017/023180 on 9 Feb. 2017, and which claims priority to New Zealand Application No. 710795, filed 6 Aug. 2015, which applications and publication are incorporated by reference as if reproduced herein and made a part hereof in their entirety, and the benefit of priority of each of which is claimed herein.

FIELD OF THE INVENTION

This invention relates to an inductive power transfer (IPT) system for transferring power wirelessly. The invention is particularly directed to a hybrid IPT system that has an ability to adapt to changes in power transfer characteristics, for instance having improved spatial tolerance.

BACKGROUND

Inductive power transfer (IPT), which is also known as wireless power transfer, is gaining acceptance as the preferred technology for transferring power across air gaps without any physical contacts due to the high efficiency, isolation, environmental inertness and general convenience offered by this technology. To date, IPT technology has been used in a variety of industrial and commercial applications, and is continually adopted for new applications where properties such as safety, convenience and physical isolation are required. The majority of traditional IPT applications require uni-directional flow of power. However, the particular interest of IPT in some industries such as the electric vehicle (EV) industry has shifted focus towards bidirectional inductive power transfer (BD-IPT) systems. The BD-IPT technology enhances the utilization of EVs by enabling the storage and retrieval of energy; a concept known as vehicle-to-grid (V2G), which aids mitigating issues related to intermittent renewable energy generation.

To improve the performance by minimizing the volt-ampere (VA) rating of the converters used in the primary and secondary (pick-up) IPT circuits, traditional BD-IPT systems employ compensation networks in both the primary and pick-up circuits, which are either parallel tuned inductor-capacitor-inductor (LCL) networks or series tuned capacitor-inductor (CL) networks. In EV charging applications, physical movement between the magnetic couplers of both the primary and pick-up is unavoidable. Changes in physical displacement introduce variations in self-inductance, leakage inductance and mutual inductance. These parameter variations detune the compensation networks employed in a typical BD-IPT system, therefore causing variation in power transfer, addition losses and unstable operations.

Although a number of solutions to improve the performance of an IPT system under spatial misalignment have been proposed, these methods require complicated control schemes and circuit topologies to achieve marginal improvements over a narrow range of displacements. The complexity and delay introduced by these systems and/or their controllers reduces system reliability. In some cases the modulation scheme employed to regulate the output reduces the efficiency, as it introduces extra switching losses.

Other methods rely on the optimization of the magnetic couplers, where a near constant flux density is maintained within a limited range of horizontal displacement. For example the power throughput and efficiency of a BD-IPT system under spatial misalignment is mainly determined by the type of compensation network employed in the primary and the pick-up circuits. A series-parallel-series (SPS) compensation topology, which is said to be capable of maintaining a near constant power throughput within a narrow range of plus or minus 30% horizontal displacement has also been proposed. Patent publications WO2010090539, WO2011016737 and WO2012018269 describe systems in which the design of the magnetic coupling structure used to generate or receive magnetic fields is adapted to improve the magnetic coupling and thus the efficient transfer of power.

OBJECT OF THE INVENTION

It is an object of the invention to provide a hybrid IPT system which overcomes or at least ameliorates one or more disadvantages of the prior art, or alternatively to at least provide the public with a useful choice.

It is an object of the invention to provide an IPT system which provides power transfer with horizontal and/or vertical changes in displacement which overcomes or at least ameliorates one or more disadvantages of the prior art, or alternatively to at least provide the public with a useful choice.

Further objects of the invention will become apparent from the following description.

SUMMARY OF INVENTION

In one aspect there is provided an inductive power transfer system primary or secondary apparatus, the apparatus comprising:
  a first compensation network and second compensation network for providing power to or receiving power from at least one coil associated with a magnetic flux coupler; and
  wherein the first and second compensation networks each have a different power transfer characteristic.

In another aspect there is provided a power supply apparatus or pick-up for an inductive power transfer system comprising a magnetic flux coupler, the apparatus comprising:
  a first and second compensation network for powering at least one coil magnetically associated with the magnetic flux coupler; and
  wherein the first and second compensation network each have a different power transfer characteristic.

The use of different power transfer characteristics created by the compensation networks allows the system to have a mixture of impedance characteristics which can be exploited to improve overall performance, for instance under coupler-misalignment. For example if a first compensation network has a negative effect on the power flow, a positive effect can be introduced by the second compensation network.

In an embodiment the power transfer characteristic is used to maintain a required power characteristic.

This allows the IPT apparatus to provide a required (for instance a substantially constant) power characteristics despite changes to the system.

Changes to the system may include, for example, horizontal or vertical distance fluctuations (coupler misalignments) or changes in the apparent impedance or reflected impedance, aging of variation of components.

In an embodiment the magnetic flux coupler is a pad.

In an embodiment the difference in power transfer characteristic is with respect to distance.

In an embodiment the difference in power transfer characteristic is with respect to alignment.

In an embodiment the difference in power transfer characteristic is with respect to the amount power transferred at a range of distances.

In an embodiment the different power transfer characteristic of the first compensation network is complementary to the characteristic of the second compensation network.

In an embodiment a change that causes an increase in the characteristic of the first compensation network substantially results in a decrease in the characteristic of the second compensation network.

In an embodiment the first and second compensation network have different network topologies adapted to cause the difference in power transfer characteristic.

In an embodiment the first and second compensation network differ by at least one circuit component.

In an embodiment the first and second compensation network have a first and second topology respectively.

In an embodiment the at least one circuit component affects the resonant properties of the compensation network.

In an embodiment the first compensation network is a series tuned compensation network and the second compensation network is a parallel tuned compensation network.

In an embodiment the first compensation network is an Inductor-Capacitor-Inductor (LCL) circuit and the second compensation network is a (Capacitor-Inductor) CL circuit.

In an embodiment there is, in use, a relative compensation phase difference or phase modulation between the first and second compensation networks.

In an embodiment there is, in use, a relative coil phase difference or phase modulation between primary and secondary coils.

In an embodiment the relative phase difference is substantially 180 degrees.

In an embodiment a change in the power transfer of the first compensation network is at least in part compensated by a change in the power transfer of the second compensation network.

In an embodiment the power transfer characteristic comprises an impedance or phase angle or angular frequency.

In an embodiment the power transfer characteristic is adapted to provide a spatial tolerance to the power transfer.

The spatial tolerance can be controlled by phase modulation and/or angular frequency and/or relative phase angle between the converters on primary and pick-up sides.

In an embodiment the first and second compensation network are in electrical connection with a single converter.

In an embodiment the first and second compensation network are in electrical connection with a first and second converter respectively.

In an embodiment the first converter and second converter are driven by the same power source.

In an embodiment the first and second compensation network are respectively associated with a single coil. In an embodiment the coil is magnetically associated with the magnetic flux coupler.

In an embodiment the first and second compensation network are respectively associated with first and second coils, the coils magnetically associated with the magnetic flux coupler.

In an embodiment the coils associated with the magnetic coupler are adapted to be substantially mutually decoupled.

In an embodiment the magnetic flux coupler is a Bipolar pad or Double D pad.

In an embodiment the apparatus comprises a plurality of compensation networks for powering at least one coil magnetically associated with the magnetic flux coupler.

In an embodiment the magnetic flux coupler is a 3-phase pad.

In a further aspect the invention may broadly be said to consist in an IPT system comprising a power-supply as in the first aspect and a pick up.

In an embodiment the pick-up is a pick-up as described in the first aspect.

In another aspect there is provided a method of controlling energy flow in a primary or secondary circuit of an IPT system, the method comprising:

magnetically coupling a coil to another IPT primary of secondary circuit;

supplying power to a first compensation network having a first power transfer characteristic which varies with coupling; and supplying power to a second compensation network having a second power transfer characteristic to compensate for the power transfer characteristic of the first compensation network.

In a further aspect the invention may broadly be said to consist in a method of controlling energy flow in a primary or secondary circuit of an IPT system, the method comprising switching an alternating current to transfer power inductively in a first compensation network, and switching an alternating current to transfer power inductively in a second compensation network wherein the switching of the compensation network has a different power transfer characteristic.

In a further aspect the invention may broadly be said to consist in a method of transmitting power with an IPT system, the IPT system comprising a power source comprising: a first compensation network; and a second compensation network; the method comprising the steps of:

transmitting power from the power source to an associated pick-up; and wherein respective power transfer characteristics of the first and second compensation networks adapt to maintain a required power transfer.

In an embodiment the method comprises the step of allowing the mutual coupling between the power source and the pick up to change.

In an embodiment the first and second compensation networks are associated with at least one converter.

In an embodiment the first and second compensation network are associated with first and second compensation networks respectively.

In an embodiment the required power transfer is substantially constant.

In an embodiment the mutual coupling is changed by changing the horizontal and/or vertical distance between the power source and pick-up.

In an embodiment the compensation networks have different topologies that adapt in to the change in mutual coupling complementarily.

In a further aspect the invention may broadly be said to consist in a method of receiving power with an IPT system, the IPT system comprising a pick-up comprising: a first converter associated with a first compensation network; and a second converter associated with a second compensation network; the method comprising the steps of:

receiving power from the pick-up from an associated power source; and wherein respective power transfer characteristics of the first and second compensation networks adapt to maintain a required power transfer.

In an embodiment the method comprises the step of allowing the mutual coupling between the power source and the pick up to change.

In an embodiment the required power transfer is substantially constant.

In a further aspect the invention may be broadly said to consist in a power supply apparatus or pick-up for an inductive power transfer system comprising a magnetic flux coupler, the apparatus comprising: A first and second compensation network circuit for powering at least one coil magnetically associated with the magnetic flux coupler; and wherein the first and second resonant circuit have different topologies.

In a further aspect the invention may be said to consist in a hybrid bi-directional IPT system using or adapted to be used for any one or more of the methods described herein.

Further aspects of the invention, which should be considered in all its novel aspects, will become apparent from the following description.

DRAWING DESCRIPTION

A number of embodiments of the invention will now be described by way of example with reference to the following drawings.

DETAILED DESCRIPTION OF THE DRAWINGS

Figure 1:
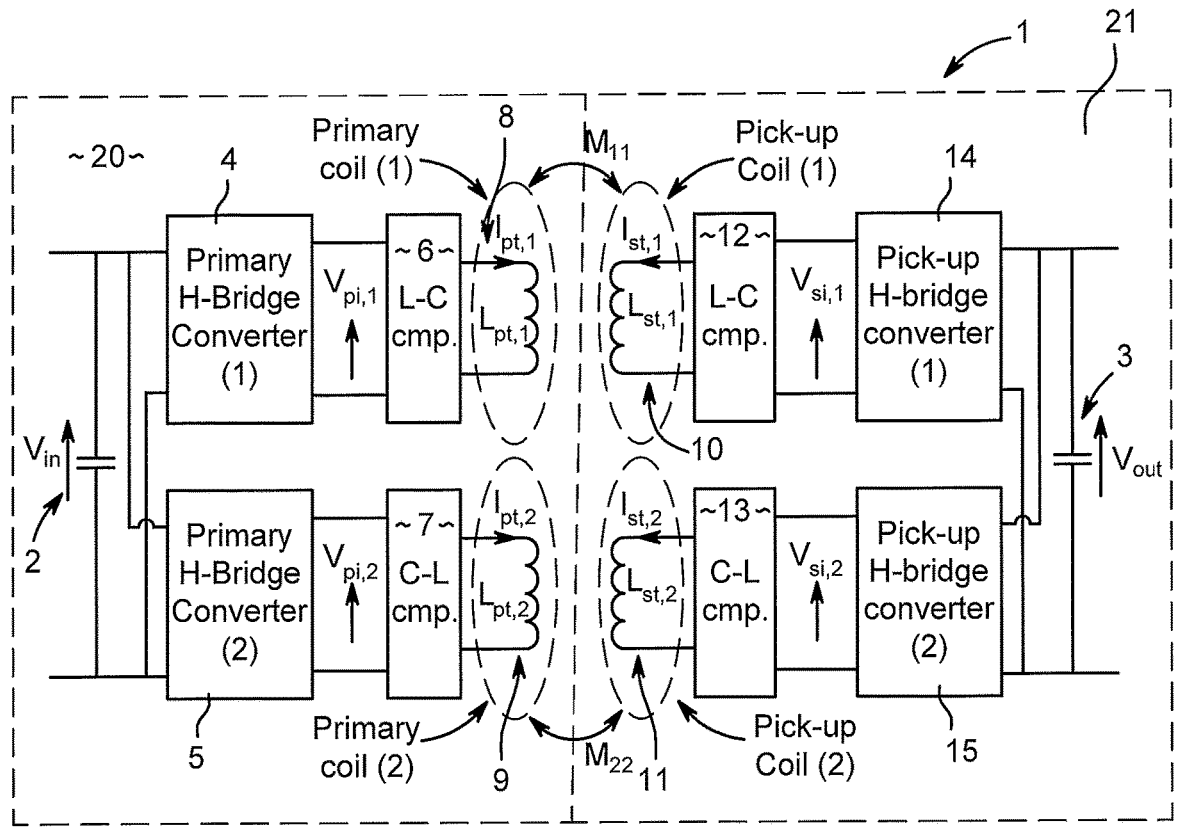
FIG. 1 is a diagram of the structure of the IPT system of an embodiment of the present invention.

FIG. 1 shows a first embodiment of the invention where a hybrid IPT system is shown, generally referenced 1. The system 1 is capable of maintaining a substantially constant power throughput over, for instance, a wide range of horizontal and/or vertical relative displacements between the prmary and secondary magnetic coupling structures. The system 1 consists of a primary or power source 20 and a secondary or pick-up 21. Although the system 1 in this example is shown as a bi-directional system, the compensation networks discussed herein may also be used in uni-directional systems to provide the same or similar advantageous power transfer characteristics. Thus, although converters are shown in both the primary and secondary sides of the system 1, in other embodiments the secondary side may have a rectifier instead.

The system 1 comprises a magnetic coupling structure, which is referred to herein as a flux pad, for controlling and supporting the transfer between the power supply and pick-up (or primary and secondary). The magnetic flux pad includes one or more coils and may simply be a support or medium for the coil windings, including for example a concrete or metal support. Alternatively the magnetic flux pad may include various shielding and flux supporting layers, such as ferrite. In a broadest sense the magnetic flux pad or coupler may refer simply to a coil. Although magnetic structures having one or two coils are referred to in the specific examples shown in the drawings, structures having three or more coils may also be used. In an embodiment of the invention the system manages a wide range of displacements between the flux pads by having converters, or more particularly compensation networks, that have different power transfer characteristics.

This difference in power transfer characteristics means, for example, that a decrease in the power transfer characteristics of a first compensation network will preferably cause an increase in the power transfer of the second (or further) compensation network. In a further example the difference may be that the compensation network reacts in a different manner to an increase in power supplied, a change in the mutual inductance between a primary and secondary, or when less power is available or required.

Referring firstly to the pick-up 20, a common power source 2 supplies power to a first converter 4 with a first compensation network 6 which is associated with a first coil 8. The common power source also supplies power to a second converter 2 with a second compensation network 7 which is associated with a second coil 9. In some embodiments the system may be modified to share a greater or fewer numbers of elements between the first and second converters. For instance the converters 4, 5 may be operated from separate power sources 2 or may supply a common coil 8, 9. By the selection of compensation networks 6, 7 that have different properties or power transfer characteristics a wider range of tolerance can be introduced to the power supplied by the power source. In the example of FIG. 1 a C-L compensation network 7, which is a series resonant compensation network, is used on a second converter 5 and an L-C compensation network 6, which is a parallel resonant compensation network, is used on a first converter 4.

In other embodiments the type of converter or the compensation network may be varied. For instance various types of parallel or series compensation networks may be used and the converter structure may be a half or full-bridge converter as shown, or an alternative topology such as a push-pull converter or a multilevel converter. Although the term compensation network has been used a person skilled in the art would understand that the terms resonant circuit, tuned circuit or similar may be used to refer to a similar arrangement. The use of different circuit topologies or arrangements for the compensation networks adds additional flexibility to the system to maintain a required power. That is, a negative effect of a first network topology can be ameliorated by a positive effect of a second network topology, or vice-versa. This is particularly the case where the compensation networks have power transfer properties or characteristics that complement each other i.e. one network partially or fully compensates for the effect of the other. Complementary networks may have different components and/or different control strategies.

FIG. 1 also shows a pick-up circuit 21 that is substantially similar to the power supply described above. A common power source 3 is supplied by a first converter 14 with a first compensation network 12 which is associated with a first coil 10. The common power source 3 also receives power from a second converter 15 with a second compensation network 13 which is associated with a second coil 11. In some embodiments the system may be modified to share a greater or fewer number of elements between the first and second converters. For instance the converters 14, 15 may provide power to separate power sources 3 or may supply a common coil 10, 11. By the selection of compensation networks 12, 13 that have different properties or power transfer characteristics a wider range of tolerance can be introduced to the power supplied by the power source. In variations to this embodiment only one of the primary or secondary may use the described system and may supply power to, or draw power from, a single coil and compensation network system. For instance the power source may be a two converter system as described but it may supply power to a pick-up having a single coil. A single coil can be cost effective, efficient and small in size but retain the flexibility due to the multiple compensation networks. In embodiments the converter may be used bi-directionally, that is as either a power source or pick-up.

FIG. 1 shows an LCL BD-IPT (Bi-directional-Inductive Power Transfer) 6, 12 system and a CL BD-IPT 7, 13 system that are combined together via a common DC 2, 3 bus in both the primary and the pick-up circuits. The power throughput of a LCL BD-IPT 6 system is proportional to the mutual inductance between the magnetic couplers, whereas the power throughput of a CL system 7 is inversely proportional to the mutual inductance. Therefore, variations in mutual inductance caused by misalignment on the LCL system 6 are ameliorated, at least in part and preferably reduced to substantially to 0, by the variations in the mutual inductance of the CL system 7. Therefore the power throughput of the hybrid BD-IPT system shown in FIG. 1 may remain substantially constant.

FIG. 1 shows an embodiment of the power supply or pick-up apparatus with currents and voltages indicated. The shown primary and pick-up converters of the hybrid system consist of a converter (e.g. a half-bridge or a full-bridge converter) and the converters are controlled to produce pulse width modulated AC voltages $V_{pi,n}$ and $V_{si,n}$ with a fundamental frequency of fT. Alternatively a single 3-leg converter can be utilized in both the primary and the pick-up to derive these AC voltages. As in typical BD-IPT systems, the LCL and CL compensation networks are tuned to the fundamental frequency fT. The fundamental frequency may vary depending on the application, componentry and/or power level. In some embodiments the tuning frequency fT may be different in each converter to reduce the sensitivity or mutual coupling between the systems. For example the resonant frequencies may be separated by a band-gap to reduce cross-over effects. In embodiments the phase angle and impedance characteristics of the individual converters and/or compensation networks can provide further variables to tailor the characteristics to the use of the system. For example a user may modify the phase angle between converters driving first and second compensation networks on the primary side and/or phase angles between the primary and secondary side.

The primary side converters generate a controlled current $I_{pt,1}$ and $I_{pt,2}$, in the primary windings $L_{pt,1}$, 8 and $L_{pt,2}$, 9 respectively. Although in FIG. 1 $L_{pt,1}$, 8 and $L_{pt,2}$ 9 are shown as two separate coils in form of individual magnetic couplers or pads, these can be the two coils of a polarized coupler. For example $L_{pt,1}$, and $L_{pt,2}$ can consist of the two coils which comprise part of a single winding, such as the polarised coupler disclosed in WO2010090539 (referred to as a DD pad). In another example the coils may be overlapped so as to have minimal or zero mutual coupling between them, such as the couplers disclosed in WO2011016737 and WO2012018269 (referred to as bi-polar pads). The use of a bi-polar pad has a particular advantage that the substantial mutual decoupling of the two or more coils results in the converters being able to be controlled substantially independently so that there is minimal cross-coupling. Embodiments of the invention may be incorporated into a coupler or coil in which there is substantially no mutual coupling between a pair, or plurality of coils. In alternative embodiments the mutual coupling between primary coils, or secondary coils, can be reduced by control of the phase difference between the coils. For example if the phase of the first converter 4 is at 90 degrees and the second converter 5 is at −90 degrees then the effect of mutual coupling between the coils is substantially reduced, preferably to 0. The 180 degree phase difference means that the mutual coupling should result in the transfer of substantially real power transfer, which affects the power transfer level but does not increase losses. However a person skilled in the art would understand that the phase angle does not need to be 180 degrees. In some circumstances the phase angles between compensation networks or primary and secondary converters may be adjusted to target required power characteristics for the circuit. In practice, we have found that there is little variation in cross coupling due to pad misalignment.

The magnetic field produced by $L_{pt,n}$ induces a voltage across the corresponding secondary winding, $L_{st,n}$, which is magnetically coupled with $L_{pt,n}$, enabling power transfer across the air-gap between $L_{pt,n}$ and $L_{st,n}$. Similar to the construction of $L_{pt,1}$ 8 and $L_{pt,2}$ 9, the pick-up coils, $L_{st,1}$ 10 and $L_{st,2}$, 11 can be the two coils found in a typical polarized coupler. The pick-up (secondary) circuit can be implemented with virtually identical electronics, which include converters, compensation circuits and a dedicated controller. For simplicity, the active load on the pick-up side is represented by a voltage source, Vout. In practice, this voltage source may be the battery pack of an EV used for storing or retrieving energy or other energy source.

A mathematical model of the described system operating under steady state conditions can be described. Using the mathematical model the behaviour of a proposed system can be tested, for instance a 3.3 kW hybrid BD-IPT system is investigated under a range of practical operating conditions. The details of the magnetic couplers proposed to be used with the system of the present invention are then discussed with reference to self-inductance, leakage inductance and mutual inductance variations due to horizontal and vertical displacement. Simulated results show the ability of the hybrid system to maintain a constant power throughput over a wide range of displacements. In order to gain an insight into the operation of the system of the present invention a mathematical model is developed by modelling the LCL and CL networks individually and then results are combined to obtain a comprehensive model of the hybrid system. This process may be followed in developing alternative complementary converter systems. That is where separate models indicate opposing behaviour of some characteristic applying the two converters may allow a balanced performance. In the described case the model characterises the stability and the power transfer of the hybrid system, accounting for changes in displacement between the couplers.

Figure 2:
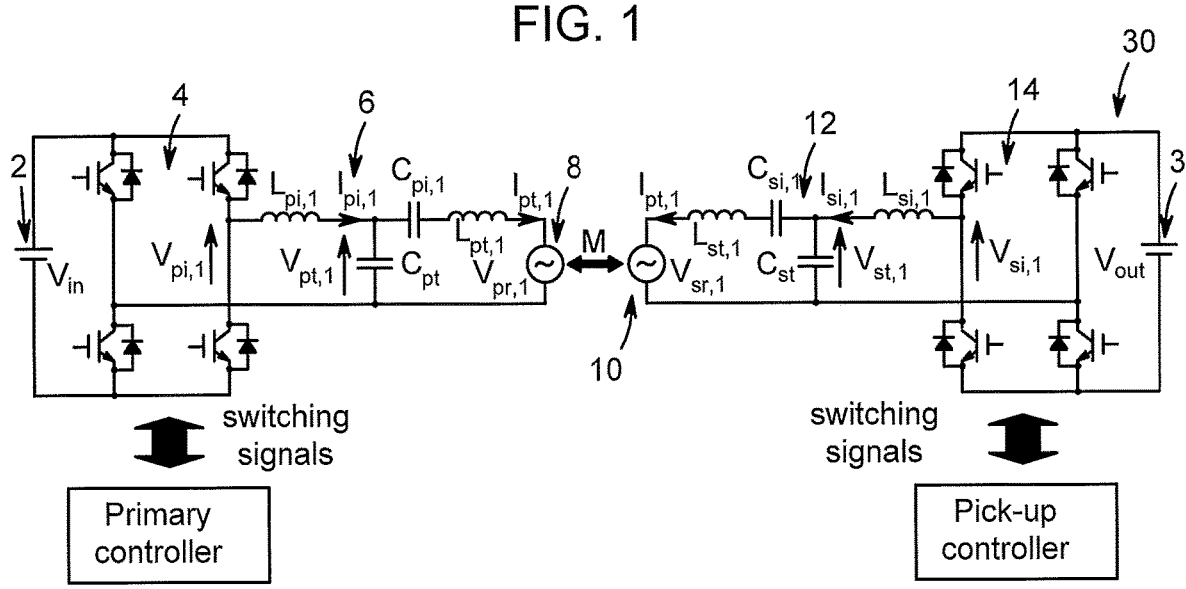
FIG. 2 is an LCL bi-directional IPT system as used in part of FIG. 1.
Figure 3:
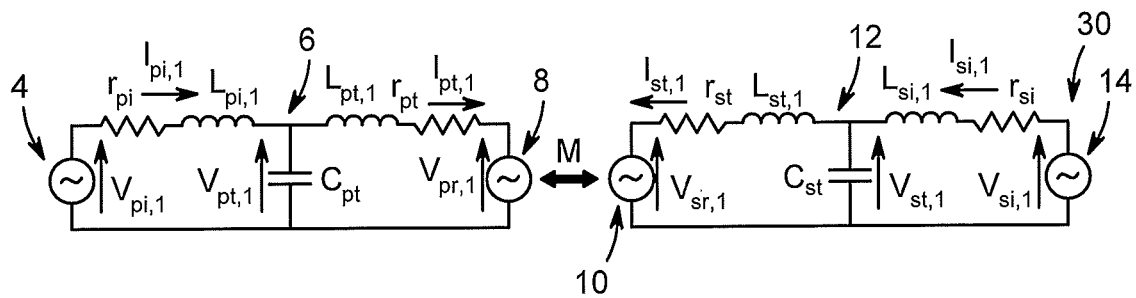
FIG. 3 is an equivalent circuit model of the LCL bi-directional IPT system of FIG. 2.

FIGS. 2 and 3 demonstrate a parallel tuned circuit, in this case an LCL circuit, and equivalent model which may be implemented in the system 1 of FIG. 1. The LCL-LCL network together with its power converter, assuming that the hybrid system in FIG. 1 employs four full-bridge converters to drive the compensation networks 6, 12, is schematically shown in FIG. 2. The primary and pick-up full-bridge converters 4, 14, driving the primary 20 and pick-up 21 LCL networks, are controlled to produce voltages Vpi,1 and Vsi,1. The magnitudes of the produced voltages can be controlled by shifting the phase modulations $\varphi_{p,1}$ and $\varphi_{s,1}$ with a given relative phase angle, θ1. The BD-IPT 1 system can be analysed in the phasor-domain using the circuit model shown in FIG. 3. Neglecting the harmonics, the voltages Vpi,1 and Vsi,1, produced by the two converters at fundamental frequency, can be given by, $$V_{pi,1} = V_{in} \frac{2\sqrt{2}}{\pi} \cos(\omega_T t) \sin\left(\frac{\varphi_{p,1}}{2}\right), \text{ and}$$

$$V_{si,1} = V_{out} \frac{2\sqrt{2}}{\pi} \cos(\omega_T t - \theta_1) \sin\left(\frac{\varphi_{s,1}}{2}\right)$$

where $\varphi_{p,1}$ and $\omega_{s,1}$ are the phase-modulations applied to the primary 20 and the pick-up 21 converters respectively.

The voltages Vpr,1 and Vsr,1 induced in primary and pick-up windings, respectively, can be given by, $V_{pr,1} = j\omega M.1_{st,1}$ and $V_{sr,1} = j\omega M 1_{pt,1}$. The current flowing in the primary and pick-up windings under a given set of circuit parameters can be given by, $$I_{pt,1} = \frac{1}{K} \left[ I_{out,1} \frac{Z_{p,1}}{Z_p + j\omega L_{pt,1} + r_{pt}} + \frac{j\omega M Z_{s,1}}{(Z_{p,1} + j\omega L_{pt,1} + r_{pt})(Z_{s,1} + j\omega L_{st,1} + r_{st})} \right]$$

$$I_{st,1} = \frac{1}{K} \left[ I_{in,1} \frac{Z_{s,1}}{Z_{s,1} + j\omega L_{st,1} + r_{st}} + \frac{j\omega M Z_{p,1}}{(Z_{p,1} + j\omega L_{pt,1} + r_{pt})(Z_{s,1} + j\omega L_{st,1} + r_{st})} \right]$$

where;

$$I_{in,1} = \frac{V_{pi,1}}{r_{pi} + j\omega L_{pi,1}} \text{ and } I_{out,1} = \frac{V_{si,1}}{r_{si} + j\omega L_{si,1}}$$

$$L_{pt,1} = L_{pt,1} - \frac{1}{\omega^2 C_{pi,1}} \text{ and } L_{st,1} = L_{st,1} - \frac{1}{\omega^2 C_{si,1}}$$

$$Z_{p,1} = \frac{j\omega L_{pi,1} + r_{pi}}{1 - \omega^2 L_{pi,1} C_{pt} + j\omega C_{pt} r_{pi}} \text{ and } Z_{s,1} = \frac{j\omega L_{si,1} + r_{si}}{1 - \omega^2 L_{si,1} C_{st} + j\omega C_{st} r_{si}}$$

$$K = 1 + \frac{\omega^2 M^2}{(Z_{p,1} + j\omega L_{pt,1} + r_{pt})(Z_{s,1} + j\omega L_{st,1} + r_{st})}$$

Similarly, the currents sourced by the primary and the pick-up converters 4, 5 can be given by, $$I_{pi,1} = \frac{1}{Z_{pr,1} + j\omega L_{pi,1} + r_{pi}} [-I_{pr,1} Z_{pr,1} + V_{pi,1}], \text{ and}$$

$$I_{si,1} = \frac{1}{Z_{sr,1} + j\omega L_{si,1} + r_{si}} [-I_{sr,1} Z_{sr,1} + V_{si,1}] \text{ where,}$$

$$Z_{pr,1} = \frac{j\omega L_{pt,1} + r_{pt}}{1 - \omega^2 L_{pt,1} C_{pt} + j\omega C_{pt} r_{pt}} \quad Z_{sr,1} = \frac{j\omega L_{st,1} + r_{st}}{1 - \omega^2 L_{st,1} C_{st} + j\omega C_{st} r_{st}}$$

$$I_{pr,1} = \frac{j\omega M}{j\omega L_{pt,1} + r_{pt}} I_{st,1} \text{ and } I_{sr,1} = \frac{j\omega M}{j\omega L_{st,1} + r_{st}} I_{pt,1}$$

Ignoring the copper losses in the inductors the power transferred between the primary and pick-up of a parallel tuned LCL BD-IPT system can be given by, $$P = \frac{8 V_{in} V_{out}}{\pi^2} \Gamma \Lambda \sin(\theta_1) \sin\left(\frac{\varphi_p}{2}\right) \sin\left(\frac{\varphi_s}{2}\right) \text{ where,}$$

$$\Gamma = \frac{1}{\omega_T L_{pt,1}/(1 - \omega_T^2 L_{pt,1} C_{pt}) + \omega_T L_{pi,1}} \times \frac{\omega_T M}{1 - \omega_T^2 L_{pt,1} C_{pt}},$$

$$\Lambda = \frac{1}{K} \times \frac{1/(1 - \omega_T^2 L_{si,1} C_{st})}{\omega_T L_{si,1}/(1 - \omega_T^2 L_{si,1} C_{st}) + \omega_T L_{st,1}}, \text{ and}$$

$$K = 1 + \frac{\omega_T^2 M^2}{\left(\frac{j\omega_T L_{pi,1}}{1 - \omega_T^2 L_{pi,1} C_{pt}} + j\omega_T L_{pt,1}\right)\left(\frac{j\omega_T L_{si,1}}{1 - \omega_T^2 L_{si,1} C_{st}} + j\omega_T L_{st,1}\right)}$$

To minimize the VA rating of the primary and pick-up converters, both LCL networks are typically tuned to the fundamental frequency of Vpi,1, as given by, $$2\pi f_T = \omega_i = \frac{1}{\sqrt{\left(L_{pt,1} - \frac{1}{\omega_T^2 C_{pi,1}}\right) C_{pt}}} = \frac{1}{\sqrt{L_{pi,2} C_{pt}}}, \text{ and}$$

$$= \frac{1}{\sqrt{\left(L_{st,1} - \frac{1}{\omega_T^2 C_{si,1}}\right) C_{st}}} = \frac{1}{\sqrt{L_{si,2} C_{st}}}$$

where fT is the fundamental frequency of Vpi,1 and Vsi,1.

Under tuned conditions, steady state power throughput of the LCL network is given by:

$$P_{LCL} = \frac{8 \cdot V_{in} \sin(\varphi_{p,1}) \cdot V_{out} \sin(\varphi_{s,1}) \cdot \sin(\theta_1)}{\omega_T} \frac{M}{L_{pi,1} \cdot L_{si,1}}$$

where the power throughput of the LCL sub-system 30 is proportional to the mutual inductance between the magnetic couplers.

CL Sub-System

Figure 4:
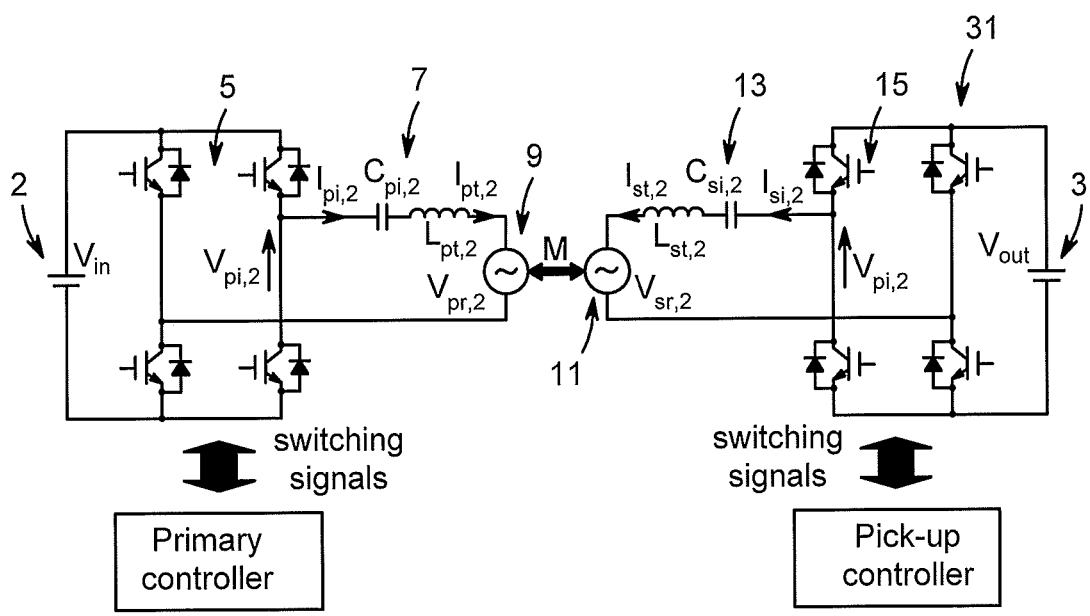
FIG. 4 is a CL bi-directional IPT system as used in part of FIG. 1.
Figure 5:
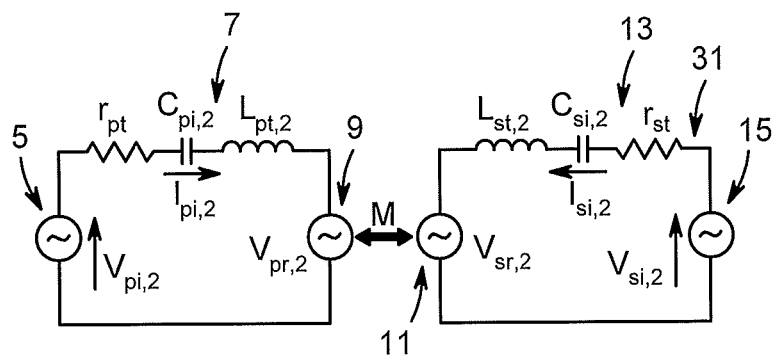
FIG. 5 is an equivalent circuit model of a bi-directional IPT system of FIG. 4.

FIGS. 4 and 5 demonstrate a series tuned circuit 31, in this case a CL circuit, and equivalent model respectively. The CL-CL network together with the two full-bridge converters 5, 15 driving this sub-system 31 is depicted in FIG. 4. The full-bridge converters 5, 15 are controlled in a similar manner to the LCL-LCL systems to produce variable magnitude voltages Vpi,1 and Vsi,1 with a relative phase displacement of θ2 between them.

This system can be analysed using the circuit model shown in FIG. 5 to obtain the currents sourced by the primary and the pick-up converters as given by, $$I_{pi,2} = I_{pt,2} = \frac{Z_{s,2}V_{pi,2} - j\omega M V_{si,2}}{Z_{p,2}Z_{s,2} + \omega^2 M^2}, \text{ and}$$

$$I_{si,2} = I_{st,2} = \frac{Z_{p,2}V_{si,2} - j\omega M V_{pi,2}}{Z_{p,2}Z_{s,2} + \omega^2 M^2}$$

where the phasor-domain voltages Vpi,2, Vsi,2, Vpr,2 and Vsr,2 are as given by and, $$Z_{p,2} = r_{pt} + \frac{1 - \omega^2 C_{pi,2} L_{pt,2}}{j\omega L_{pt,2}}$$

$$Z_{s,2} = r_{st} + \frac{1 - \omega^2 C_{st,2} L_{st,2}}{j\omega L_{st,2}}$$

Ignoring the copper losses in the inductors the power transferred between the primary 20 and pick-up 21 of a series tuned BD-IPT system 31 can be given by, $$P = \frac{8 V_{in} V_{out}}{\pi^2} \Upsilon \sin(\theta_2) \sin\left(\frac{\varphi_{p,2}}{2}\right) \sin\left(\frac{\varphi_{s,2}}{2}\right)$$

where, $$\Upsilon = \frac{\omega_T^3 M L_{st,2} L_{pt,2}}{\omega_T^4 M^2 L_{pt,2} L_{st,2} - (1 - \omega_T^2 L_{pt,2} C_{pt,2})(1 - \omega_T^2 L_{st,2} C_{st,2})}$$

The series capacitors are typically chosen to compensate the magnetizing inductances of the coils as given by, $$2\pi f_T = \omega_T = \frac{1}{\sqrt{L_{pt,2} C_{pt,2}}} = \frac{1}{\sqrt{L_{st,2} C_{si,2}}}$$

where fT is the fundamental frequency of Vpi and Vsi.

A steady state power transfer equation for the CL compensated network in the tuning point is given by $$P_{CL} = \frac{8 \cdot V_{in} \sin(\varphi_{p,2}) \cdot V_{out} \sin(\varphi_{s,2}) \cdot \sin(\theta_2)}{\omega_T} \frac{1}{\pi^2 \cdot M}$$

Comparing with the LCL compensation, the power throughput is inversely proportional to the mutual inductance between the magnetic couplers.

Hybrid BD-IPT System

The power throughout of the hybrid BD-IPT system, which consists of the LCL and the CL sub-system, can be obtained through vector summation of $P_{LCL}$ and $P_{CL}$. Under tuned conditions, and assuming $\theta_1$ is 90°, $\theta_2$ is −90° and $\varphi_{p,1} = \varphi_{s,1} = \varphi_{p,2} = \varphi_{s,2} = \varphi$, this can be simplified to, $$P_{hybrid} = \frac{8 \cdot V_{in} \sin(\varphi_p) \cdot V_{out} \sin(\varphi_s)}{\omega_T} \cdot \left(\frac{M}{L_{pi,1} \cdot L_{si,1}} + \frac{1}{\pi^2 \cdot M}\right).$$

Similarly the power could be combined without the simplifying assumptions made above. This leads to a more complex equation for Phybrid, however demonstrates that the power could be controlled through phase angle (of the compensation networks, φ, or between the converters, $\theta_1$, $\theta_2$) phase modulations and frequency to compensate for changes in magnetic inductance M. By modification of these parameters the power transfer can be controlled to a required power characteristic. In an embodiment this may be a substantially constant power transfer for spatial misalignment. In other embodiments the required power characteristic may have a sloped, curved or a varying waveform, for instance to provide location or other information.

Figure 6:
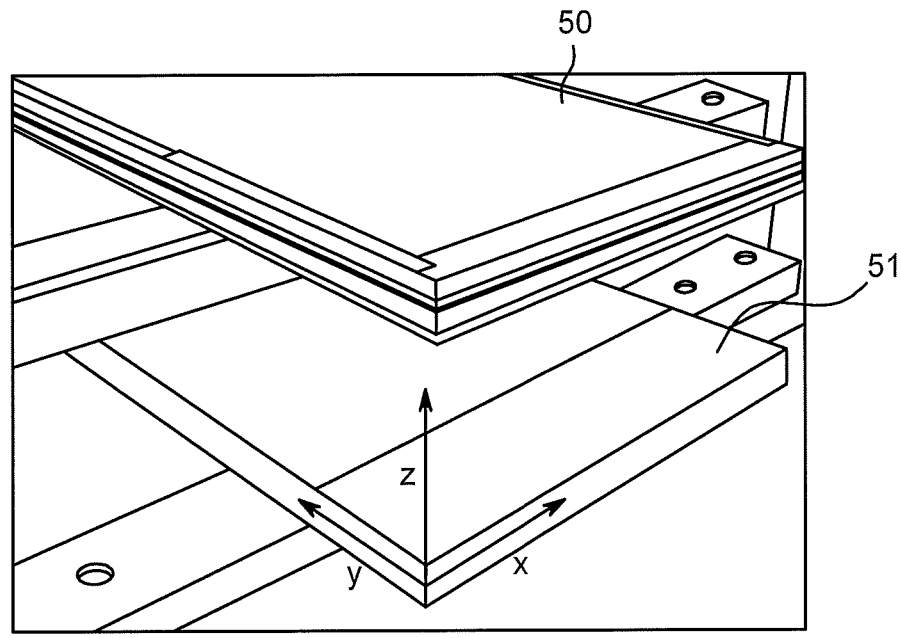
FIG. 6 shows the primary and pick-up apparatus placement in an embodiment of this invention.

FIGS. 7 to 10 demonstrate the efficiency, power and stability of combined BD-IPT system at varying horizontal and vertical displacements of the pick-up with reference to the stationary magnetic couplers from simulations, and an expermental set-up is shown in FIG. 6. The simulations have been conducted to emulate the variations caused by vehicle loading conditions or an average driver parking over a charging station. During use the air-gap between corresponding coils may change, as may the alignment of the coils. Previous work has not been adapted to minimise vertical alignment. An operational air gap of 80-120 mm between the two coils (or groups of coils) 8, 9, 10, 11, and a maximum horizontal misalignment of 160 mm was considered a practical displacement region in an EV charging application. The tuned position 61 for each system was chosen as the location when the pick-up coil is orientated directly 100 mm above the primary coil; simulating the average height of a motor vehicle with the orientation for maximum coupling.

FIG. 6 shows the primary 51 and the pick-up 50 of an embodiment of the hybrid IPT system using identical DD type magnetic coupler for coils Lpt1, Lpt2, Lst1, and Lst2. However, as previously discussed, the coils Lpt1 and Lpt2 can be the two coils found in a polarized coupler such as a bi-polar coupler. Similarly, coils Lst1 and Lst2 can consist of the two coils found in a polarized coupler. The inductance of these DD couplers and the coupling coefficient between them were measured and recorded at multiple displacement points (x, y, z coordinates) above the stationary primary coupler.

Figure 7:
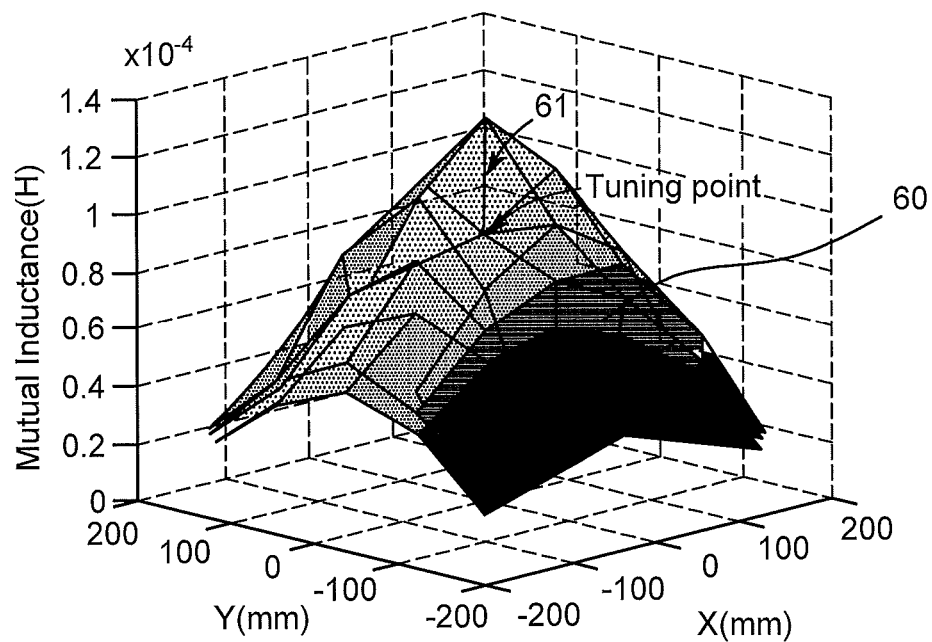
FIG. 7 is a graph of an embodiment where mutual inductance varies with displacement of the apparatus.

FIG. 7 depicts the variation in mutual inductance as a function of distance, representing the displacement between the couplers or coils 50, 51. The variation in mutual inductance 60 means that a single coil pickup would experience a variation in the available power dependent on where it was located in relation to the power source. That is the movement of the pick-up away from the tuning point 61 or ideal location is reduced. As evident from these recorded values, the mutual inductance of the coils varied from 102 μH at the maximum coupling point (0, 0, 80) to 41 μH at the minimum coupling position (160, 160, 120), while self-inductance only changes from 186 uH to the maximum 209 uH for same displacement. A challenge in this situation is to ensure a steady power can be supplied across the coil displacements.

Table I shows a list of parameters of an embodiment of a hybrid 3.3 kW system, which utilizes the DD couplers introduced in the previous section. This system was simulated using MATLAB Simulink™ Piece-wise Linear Electrical Circuit Simulator (PLECS). The hybrid system was implemented with an open loop controller with fixed modulation values (φp,1=φs,1=φp,2=φs,2=φ), to regulate the power throughput over wide range of displacement.

TABLE I

PARAMETERS OF THE LCL AND CL BD-IPT SYSTEM

| Parameter | LCL Value | CL Value |
|---|---|---|
| $V_{in}$ & $V_{out}$ | 200 V | 200 V |
| $L_{pi}$ & $L_{si}$ | 40.0 μH | — |

TABLE I-continued

PARAMETERS OF THE LCL AND CL BD-IPT SYSTEM

| Parameter | LCL Value | CL Value |
|---|---|---|
| $L_{pt}$ & $L_{st}$ | 48.8 µH (DD coupler) | 198.5 µH (DD coupler) |
| $C_{pt}$ & $C_{st}$ | 0.396 µF | — |
| $C_{pi}$ & $C_{si}$ | 1.6025 µF | 0.0798 µF |
| $R_{pi}$ & $R_{si}$ | 13 mΩ | — |
| $R_{pt}$ & $R_{st}$ | 122 mΩ | 122 mΩ |
| $R_{cpt}$ & $R_{cst}$ | 10 mΩ | — |
| $R_{cpi}$ & $R_{csi}$ | 17 mΩ | 12 mΩ |
| k | 0.403 | 0.403 |
| Switches | IKW15N120H3 | IKW15N120H3 |

Figure 8:
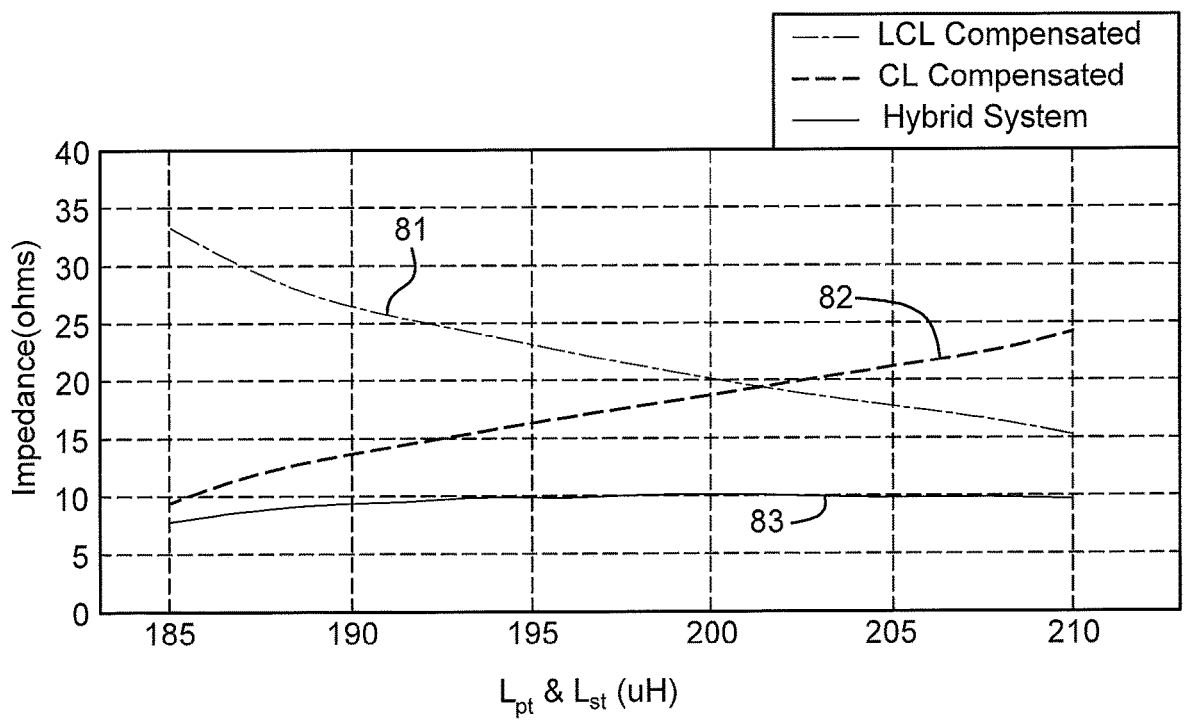
FIG. 8 shows plots of the impedance vs inductance for the separate and combined systems.
Figure 8:
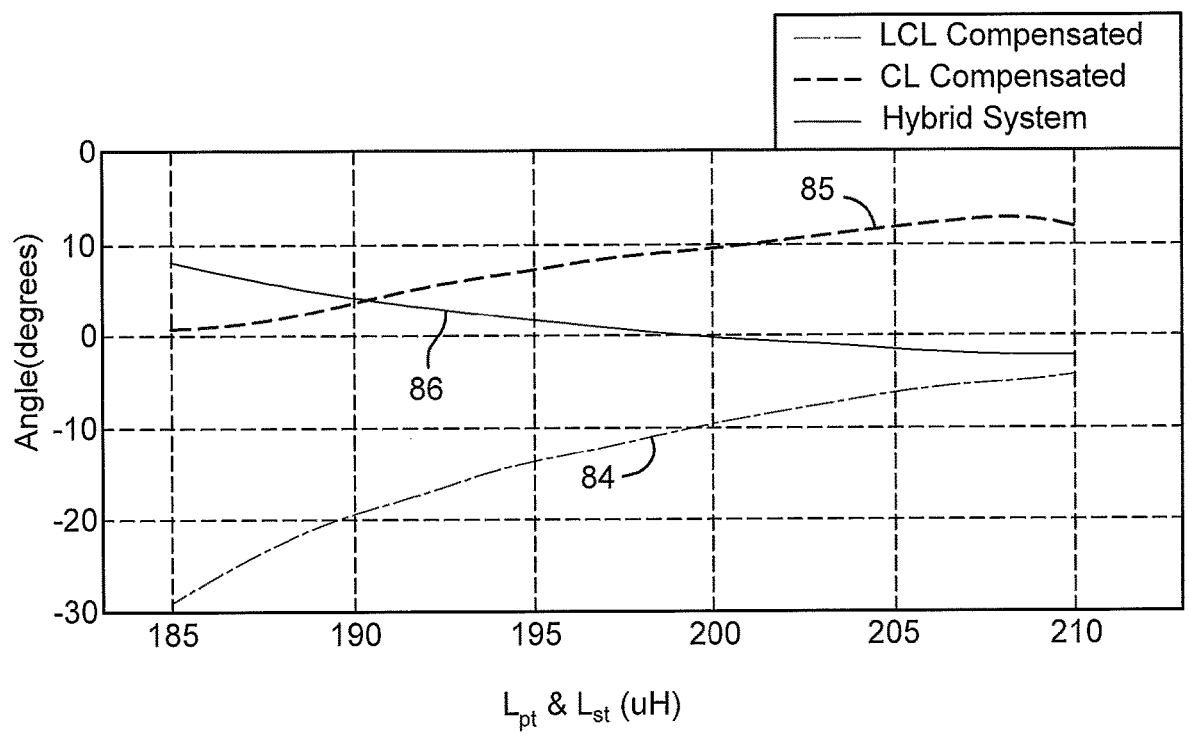

FIG. 8 shows the effect on the impedance for the LCL, CL and an embodiment of the disclosure. Changes to the displacement of the pick-up coupler or coil 10, 11, relative to the typically stationary primary coupler 8, 9 introduce variations in coupler self-inductance and mutual-inductance, which detunes the compensation networks employed in each individual IPT system 1. The deviation from designed tuned frequency causes drastic changes to the loading of the primary power supply, significantly affecting the stability of the overall system and thus may threaten the useful life of the semiconductor devices. Variations in the input impedance Zin seen by the primary converter 4, 5 under misalignment between the primary and pick-up coils, or couplers, can be large. FIG. 8 shows the variation in Zin magnitude for LCL sub-system 81 is inversely proportional to Lpt whereas the variation or change in Zin magnitude of the CL sub-systems 82 is proportional to Lpt.

When an embodiment of the hybrid system is used the proportionality and inverse proportionality operate against each other. That is when the inductance is low the LCL circuit has a high impedance and the CL circuit a low impedance and vice versa when the inductance is high. Therefor as the calculations show a combination of the LCL and CL or series and parallel circuits the combined input impedance 83 of the hybrid system is substantially constant across the displacement range considered for this paper. A similar effect is reflected in the angle of the impedance Zin shown for the LCL 84, CL 85 and Hybrid system 86.

Figure 9:
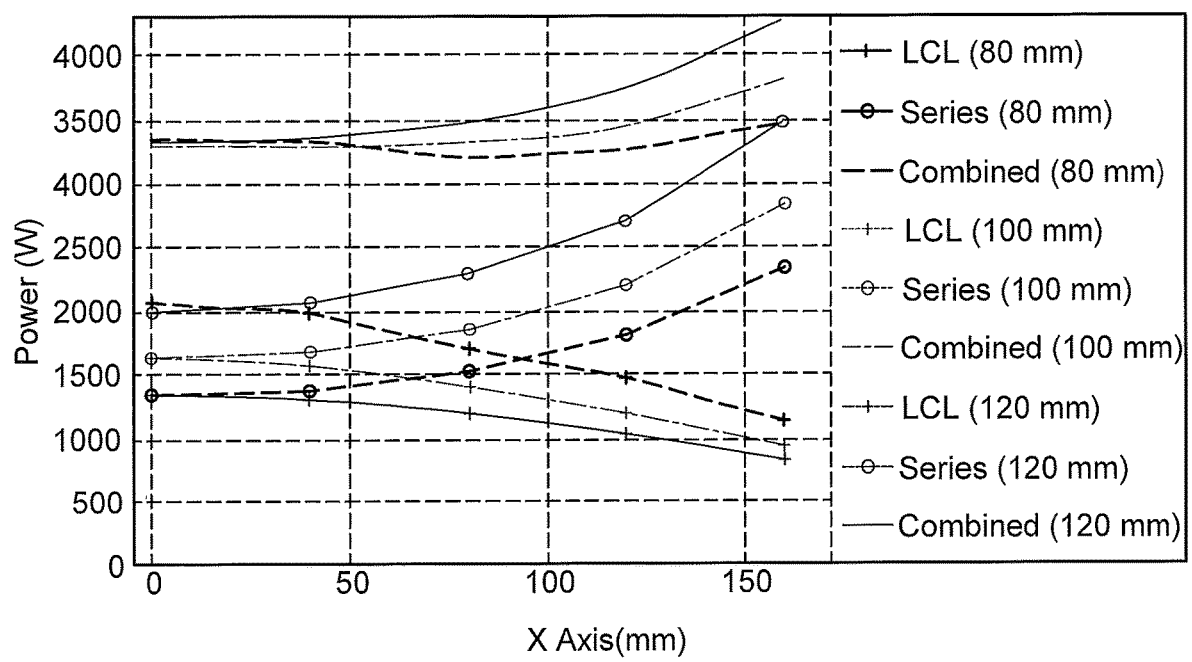
FIG. 9 shows plots of the simulated power variations for the separate and combined systems.

FIG. 9 shows the simulated relationship between the output power of individual series and parallel subsystems, in this case CL 31 and LCL 30 sub-systems, as well as the hybrid BD-IPT system at a range of distances. An operational air gap of 80-120 mm between the two coils, and maximum horizontal misalignment of 160 mm are considered as a practical displacement region in simulation. Since the output power of the CL sub-system is inversely proportional to the magnetic coupling between the couplers, the output power increases as separation between the two couplers increase. Conversely, a decline or reduction in output power is observed with increasing separation of the LCL sub-system, as the power throughput of the system is proportional to the magnetic coupling.

However, the output power of the hybrid system 1 with a fixed modulation, remains constant within approximately 10% of rated value for up to 100 mm horizontal displacement as well as for 80 mm to 120 mm vertical displacement. Therefore the hybrid BD-IPT system can minimize the impact of spatial displacement between primary and secondary windings 8, 9, 10, 11.

Figure 10:
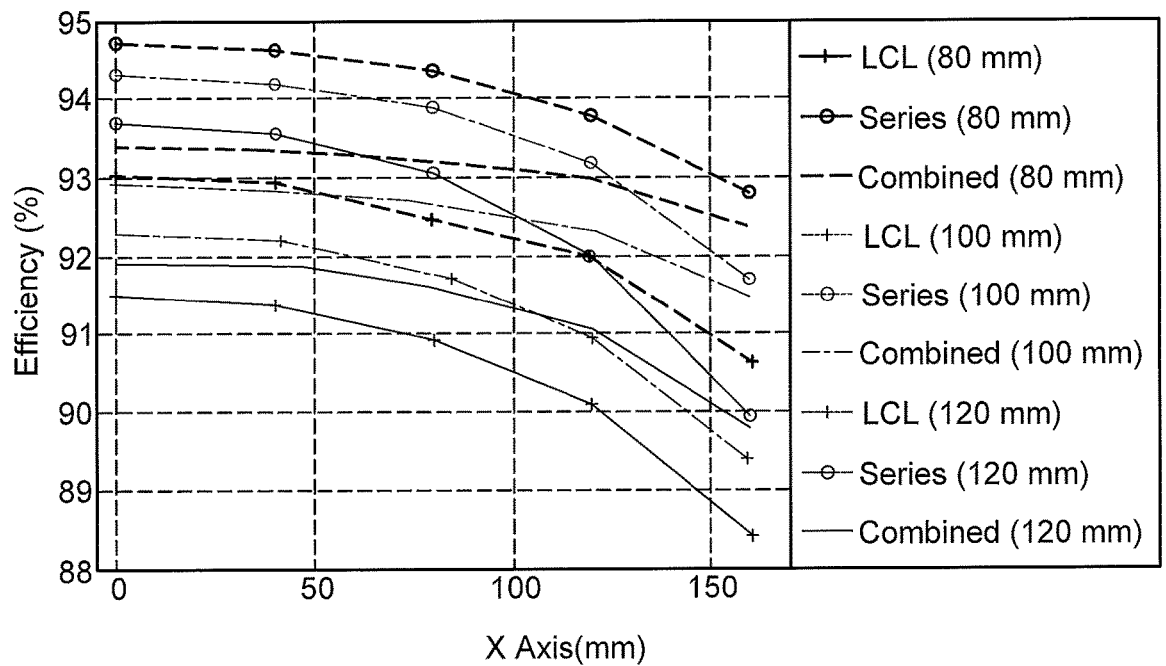
FIG. 10 shows plots of variations in simulated efficiency against variations in displacement for separate and combined systems.

FIG. 10 shows the simulated efficiencies of the individual LCL 30 and CL 31 sub-systems as well as the hybrid system 1 as a function of displacement. The embodiment of FIG. 10 shows that the CL sub-system has a higher maximum efficiency of approximately 94.5% in comparison with 92.5% of the LCL system observed at the tuned position. When couplers move with respect to each other the efficiency drops in both sub-systems. The efficiency of the hybrid system is slightly better than that of the LCL sub-system but slightly lower than the CL sub-system. Feedback control can be implemented to further regulate the output power of the hybrid system for horizontal displacements over 100 mm. The efficiency of the systems may also be affected by reducing pulse width modulation, as ZVS is lost. In alternative embodiments the power transfer characteristic may be for the horizontal distance or vertical. In this case the first coil 8 may be targeted to supply peak power at substantially zero displacement and the second coil 9 may be targeted to supply peak power at a non-zero displacement. In some embodiments the targeted or required power characteristics may be adapted by changing the control parameters, e.g. for Phybrid.

In embodiments of the invention the power transfer characteristic may be targeted at improving, e.g. by reducing, the sensitivity of the system to changes in the distance between the primary and secondary. That is the distance between the coils typically affects the mutual coupling of the coils and to maintain a constant power transfer the properties or characteristics of the converters have to be changed. It is advantageous if the distance can be automatically corrected for by having two systems in which the effect of distance changes is substantially complementary so as to act to, at least partially cancel each other. This may be occurred by the use of different topologies, such as the LCL and CL topologies explained here which have different circuit components (e.g. L and C) in their compensation networks.

Thus, the hybrid BD-IPT system has been shown to be capable of maintaining a substantially constant power throughput over a wide range of horizontal and vertical displacements. The performance of a 3.3 kW hybrid system, which comprises a parallel tuned inductor-capacitor-inductor compensation network and a series tuned capacitor-inductor compensation network has been used to demonstrate an embodiment of the invention. However it should be understood that compensation networks which can provide different power transfer characteristics are not limited to these particular arrangements or parallel and series arrangements. Embodiments of the proposed hybrid BD-IPT system can maintain a nearly constant output power up to 100 mm horizontal displacement and 40 mm vertical displacement. The hybrid system of the present invention is capable of maintaining a high efficiency as it facilitates zero voltage switching over a wide range of spatial displacements.

It may be advantageous to use decoupled coils with the poly-phase systems to ensure that the mutual coupling between the coils, or the losses therefrom are reduced. For instance a bipolar pad has coils that are decoupled to reduce cross talk between converters. These systems may have a magnetic flux pad and/or coils which are designed to operate with the cross talk or coupling from the known, or approximate, phase angles between the converters. However any number of magnetic flux pads will work with embodiments of this disclosure, including circular pads and double D pads.

The system has been described above in relation to a single phase converter with two compensation networks on the primary and/or secondary. However the system can be extended to polyphase systems including a 3-phase system. It should also be understood that the system is not limited to 1, 2 or 3 phase networks (each phase may also have a single coil, or multiple coils). The addition of further compensation networks to the system (with separate or shared coils) may be advantageous in providing further variables or parameters to help control the system.

Figure 11:
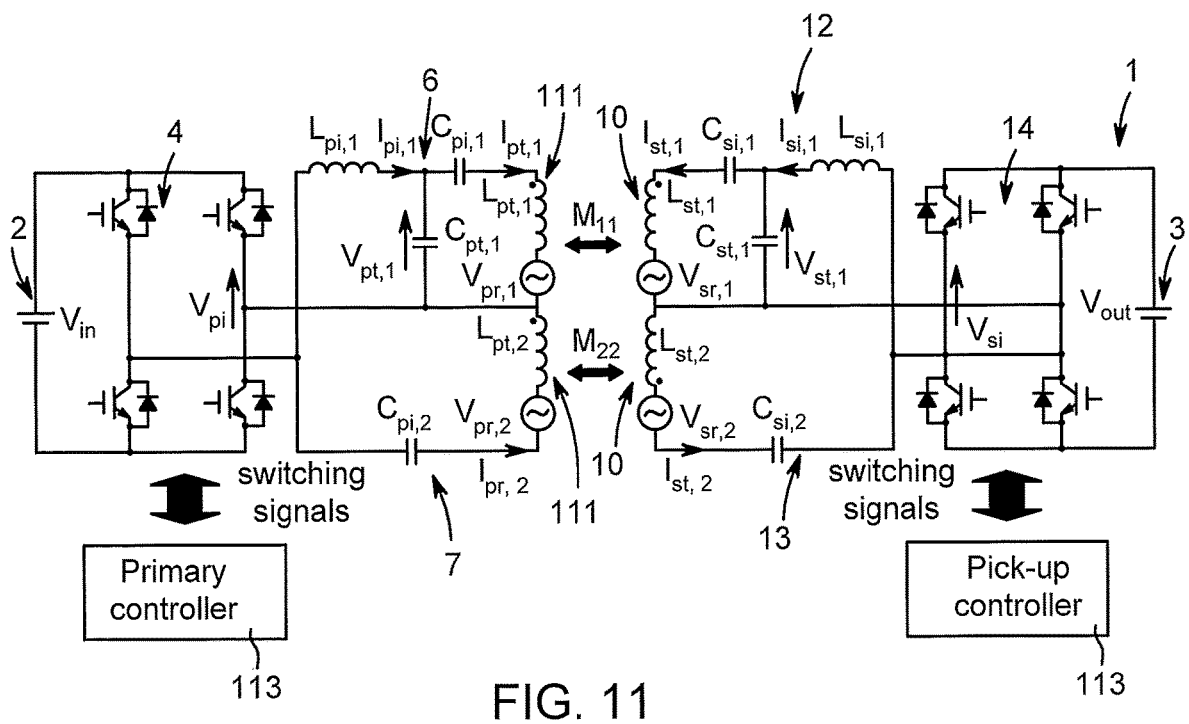
FIG. 11 is a diagram of the structure of the IPT system of an embodiment of the present invention.

FIG. 11 shows an alternative embodiment of the invention in which a single coil 111 is linked to two compensation networks 6, 7. The coil 111 may be a centre tapped coil, but could also be a single coil with common terminals for each compensation network. The embodiment shows similar designs on both the primary and secondary, but this is not necessary. Using a single coil may reduce the size and cost of the coils and the magnetic flux pad.

Figure 12:
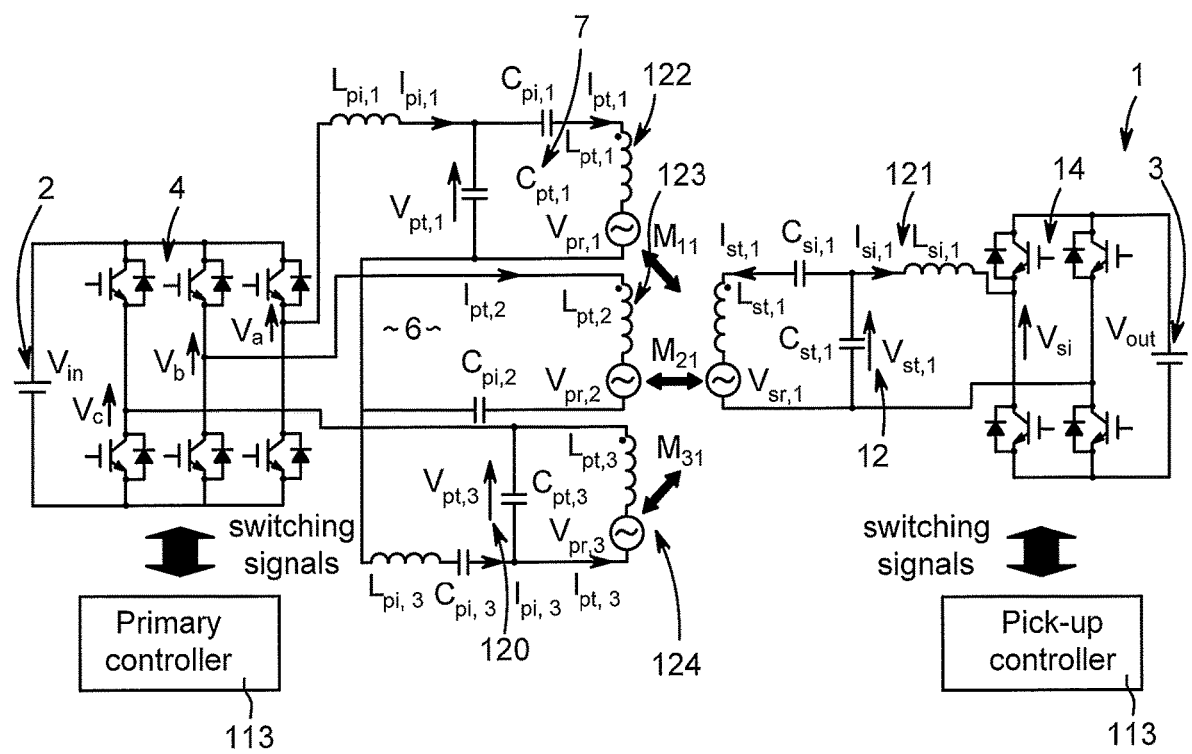
FIG. 12 is a diagram of the structure of the IPT system of an embodiment of the present invention.

FIG. 12 shows a system having three compensation networks connected to a single converter 121 in a 3-phase star arrangement. The CL 7 and LCL 6 compensation networks are combined with a hybrid compensation network 120. The coils 122, 123, and 124 are shown as separate coils but a single coil may be used. In embodiments of the invention one or more of the coils 122-124 maybe be associated with, including being combined into, a magnetic flux pad. The magnetic flux pad may include ferrite or elements or means such as aluminium to shape or control the field produced by the coils. The pick-up may use a system or, as shown in the figure, a pick-up with a single compensation network can be used.

Embodiments of the invention comprise controller means 113 or devices 113 for controlling the power transferred between the power source and pick-up converters and controlling the switching elements or converter systems. The controller means may comprise a processor means including a microprocessor or electronic switching or logic systems. The controller may be shared between the systems, or the systems may use separate controllers.

The invention may also be said broadly to consist in the parts, elements and features referred to or indicated in the specification of the application, individually or collectively, in any or all combinations of two or more of said parts, elements or features. Furthermore, where reference has been made to specific components or integers of the invention having known equivalents, then such equivalents are herein incorporated as if individually set forth.

Unless the context clearly requires otherwise, throughout the description, the words "comprise", "comprising", and the like, are to be construed in an inclusive sense as opposed to an exclusive or exhaustive sense, that is to say, in the sense of "including, but not limited to".

Any discussion of the prior art throughout the specification should in no way be considered as an admission that such prior art is widely known or forms part of common general knowledge in the field.

The invention claimed is:

1. An inductive power transfer system primary or secondary apparatus, the apparatus comprising:
   a first compensation network and second compensation network for providing power to or receiving power from at least one coil associated with a magnetic flux coupler; and
   wherein the first and second compensation networks each have a complementary power transfer characteristic;
   wherein the second compensation network is configured to reflect an impedance that is substantially inversely proportional to that of the first compensation network, and is configured to compensate for impedance variations of the first compensation network, over a range of spatial positions of the magnetic flux coupler relative to another magnetic flux coupler, when the apparatus is receiving power from, or providing power to, the other magnetic flux coupler.

2. The apparatus as claimed in claim 1 wherein the power transfer characteristic of the first compensation network at least partially compensates for the power transfer characteristic of the second compensation network.

3. The apparatus as claimed in claim 1 wherein the power transfer characteristic of each of the first and second compensation networks is dependent on distance or alignment of the magnetic flux coupler relative to another magnetic flux coupler from or to which the apparatus is receiving or transferring power.

4. The apparatus as claimed in claim 1 wherein the first and second compensation networks together provide an overall power transfer characteristic for the apparatus, and the overall power transfer characteristic is less sensitive to variations in separation and/or or alignment of the magnetic flux coupler relative to another magnetic flux coupler, from which the apparatus is receiving power, or to which the apparatus is transferring power, than the power transfer characteristic of the first compensation network and the power transfer characteristic of the second compensation network when taken individually.

5. The apparatus as claimed in claim 1 wherein the first compensation network is an Inductor-Capacitor-Inductor (LCL) circuit and the second compensation network is a (Capacitor-Inductor) CL circuit.

6. The apparatus as claimed in claim 1 wherein the first compensation network is configured to increase the power transfer characteristic, of the first compensation network, responsive to a change in coupling between the apparatus and a wireless power primary or secondary that the apparatus is receiving power from or providing power to, and the second compensation network is configured to reduce the power transfer characteristic, of the second compensation network, responsive to the change in the coupling.

7. The apparatus as claimed in claim 1 wherein the first and second compensation network are in electrical connection with a first and second converter respectively, and the first and second converters are driven by the same power source.

8. The apparatus as claimed in claim 1 wherein the first and second compensation network are respectively associated with first and second coils, the first and second coils are magnetically associated with the magnetic flux coupler, and the first and second coils are mutually decoupled.

9. The apparatus as claimed in claim 1 wherein the second compensation network is configured to substantially cancel the power transfer characteristic of the first compensation network.

10. The apparatus as claimed in claim 1, wherein the first and second compensation networks are configured to present a substantially constant impedance, over a range of spatial positions of the magnetic flux coupler relative to another magnetic flux coupler, when the apparatus is receiving power from, or providing power to, the other magnetic flux coupler.

11. The apparatus as claimed in claim 1, wherein the apparatus is an inductive power pick-up, and the inductive power pick-up is configured to reflect a substantially constant impedance over a vertical range of at last 40 mm of the magnetic flux coupler relative to another magnetic flux coupler from which the inductive power pick-up is receiving power.

12. The apparatus as claimed in claim 1 wherein the apparatus is an inductive power pick-up, the complementary power transfer characteristic of the first and second compensation networks is inductance, and the inductive power pick-up is configured to reflect a substantially constant impedance, over a range of spatial positions relative to an inductive power primary, when receiving power from the inductive power primary.

13. The apparatus as claimed in claim 1 wherein the resonant wireless power transfer apparatus is configured to present a substantially constant impedance across a horizontal range of at least 100 mm relative to the other wireless power transfer apparatus that the resonant wireless power transfer apparatus is transferring power to, or receiving power from.

14. A resonant wireless power transfer apparatus comprising a first compensation network, and a second compensation network that is complimentary to the first compensation network, wherein the second compensation network is configured to compensate for impedance variations of the first compensation network, over a range of spatial positions of the resonant wireless power transfer apparatus relative to another wireless power transfer apparatus, when the resonant wireless power transfer apparatus is transferring power to, or receiving power from, the other wireless power transfer apparatus; and wherein the resonant wireless power transfer apparatus is configured to present a substantially constant impedance across a horizontal range of at least 100 mm, or a vertical range of at least 40 mm, relative to the other wireless power transfer apparatus that the resonant wireless power transfer apparatus is transferring power to, or receiving power from.

15. The resonant wireless power transfer apparatus of claim 14, wherein the first compensation network is a parallel tuned resonant circuit, the second compensation network is a series tuned resonant circuit, and the first and second compensation networks are tuned to substantially the same resonant frequency.

16. The resonant wireless power transfer apparatus of claim 14, wherein the second compensation network is configured to present an increased impedance when movement of the resonant wireless power transfer apparatus, relative to the other wireless power transfer apparatus and within the range of spatial positions, causes a decrease in impedance in the first compensation network.

17. A wireless power pick-up comprising a first compensation network, and a second compensation network that is complimentary to the first compensation network, wherein the wireless power pick-up is configured to reflect a substantially constant impedance, across a range of spatial positions of the resonant wireless power pick-up relative to a wireless power transfer primary, when the resonant wireless power pick-up is receiving power from the wireless power primary, and wherein the first compensation network is configured to reflect an impedance, when the wireless power pick-up is positioned within the range of spatial positions and receiving power from the wireless power primary, that is substantially proportional to a first spatial parameter, and the second compensation network is configured to concurrently reflect an impedance that is substantially inversely proportional to the first spatial parameter.

18. The resonant wireless power pick-up of claim 17, wherein the second compensation network is configured to substantially compensate for impedance changes in the first compensation network within the range of spatial positions.

* * * * *